United States Patent [19]

Heyer et al.

[11] 4,319,253
[45] Mar. 9, 1982

[54] ELECTRONIC STENCIL CUTTER

[75] Inventors: Arthur J. Heyer, Forest Park; Edward M. Springer, Chicago; Wallace C. Clay, Oakbrook, all of Ill.

[73] Assignee: Heyer Inc., Chicago, Ill.

[21] Appl. No.: 176,011

[22] Filed: Aug. 7, 1980

Related U.S. Application Data

[62] Division of Ser. No. 77,160, Sep. 20, 1979, which is a division of Ser. No. 894,528, Apr. 10, 1978.

[51] Int. Cl.$^3$ ............................................. G01D 15/00
[52] U.S. Cl. ................................ 346/139 C; 346/141; 346/162; 346/165; 358/300
[58] Field of Search ............ 346/139 C, 141, 162–163, 346/164, 165; 358/300

[56] References Cited

U.S. PATENT DOCUMENTS

| | | | |
|---|---|---|---|
| 2,066,262 | 12/1936 | Finch | 346/141 |
| 3,018,153 | 1/1962 | Steen | 346/165 |
| 3,317,917 | 5/1967 | Little, Jr. et al. | 346/165 |
| 4,095,236 | 6/1978 | Tauszig | 346/139 C |
| 4,195,936 | 4/1980 | Gard et al. | 346/162 |

Primary Examiner—Joseph A. Orsino, Jr.
Attorney, Agent, or Firm—McCaleb, Lucas & Brugman

[57] ABSTRACT

An electronic stencil cutter having a rotatable drum with an original subject sheet and a stencil sheet mounted side by side thereon. Scanning and stencil cutting heads are mounted on a common carriage for simultaneous movement along the original and stencil sheets. The original subject sheet is retained in a holder consisting of a flexible, transparent sheet wrapped about the drum, one end of the retainer sheet being held releasably against the drum by a pressure-sensitive adhesive strip. The ends of the stencil sheet are held by an elongated clamp bar in a slot in the drum, the clamp bar being urged outwardly by springs and manually releasable by latch members at the ends of the bar. The stencil cutting head has a plastic stylus which is deflectible by a solenoid to press a wire electrode against the stencil sheet while cutting the stencil. The solenoid has a soft, felt-like nose which engages the stylus to dampen vibration of the electrode. The carriage is moved along the drum during the stencil cutting operation by one of a plurality of different speed drive motors as selected for the scanning speed required. Overrunning clutches associated with the non-selected motors free wheel so they do not back drag. A manually operable handle enables the carriage to be moved by hand, automatically overriding the motor drive connections.

4 Claims, 39 Drawing Figures

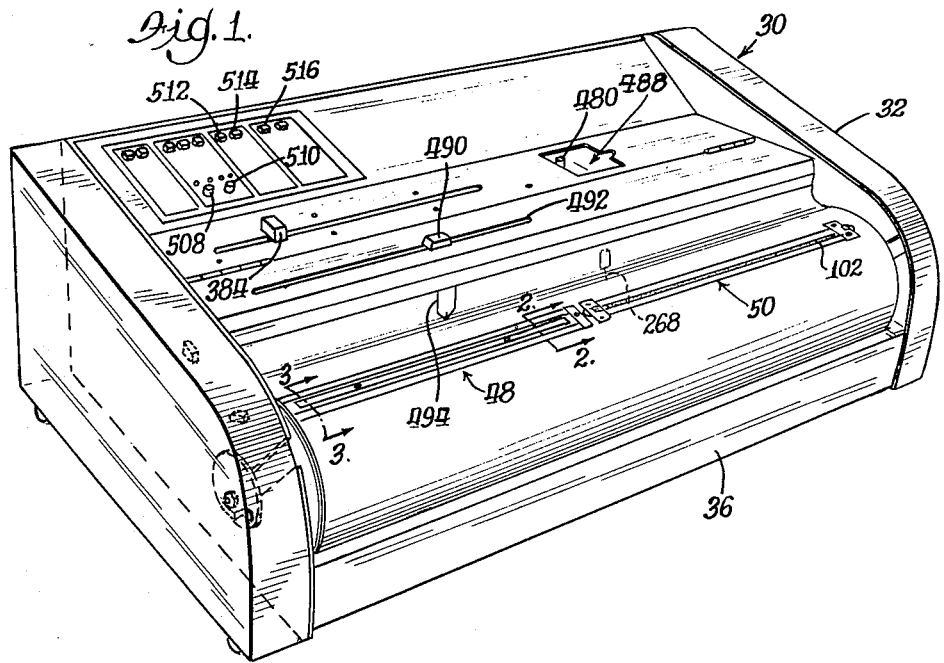
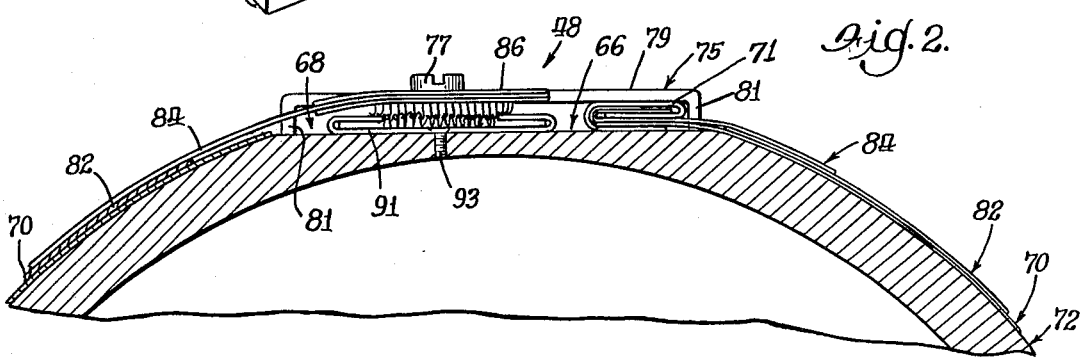
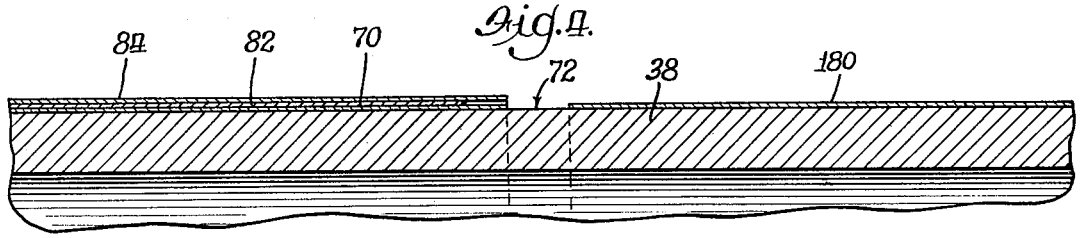
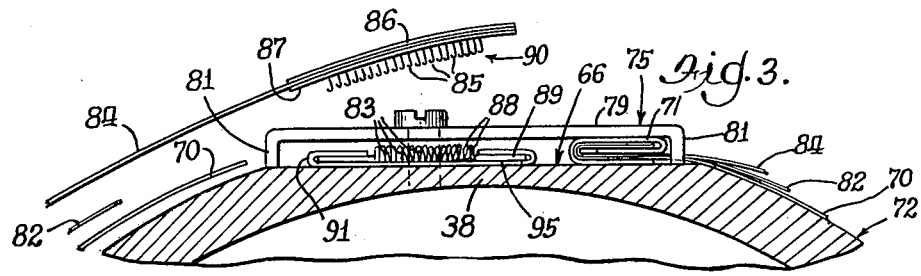

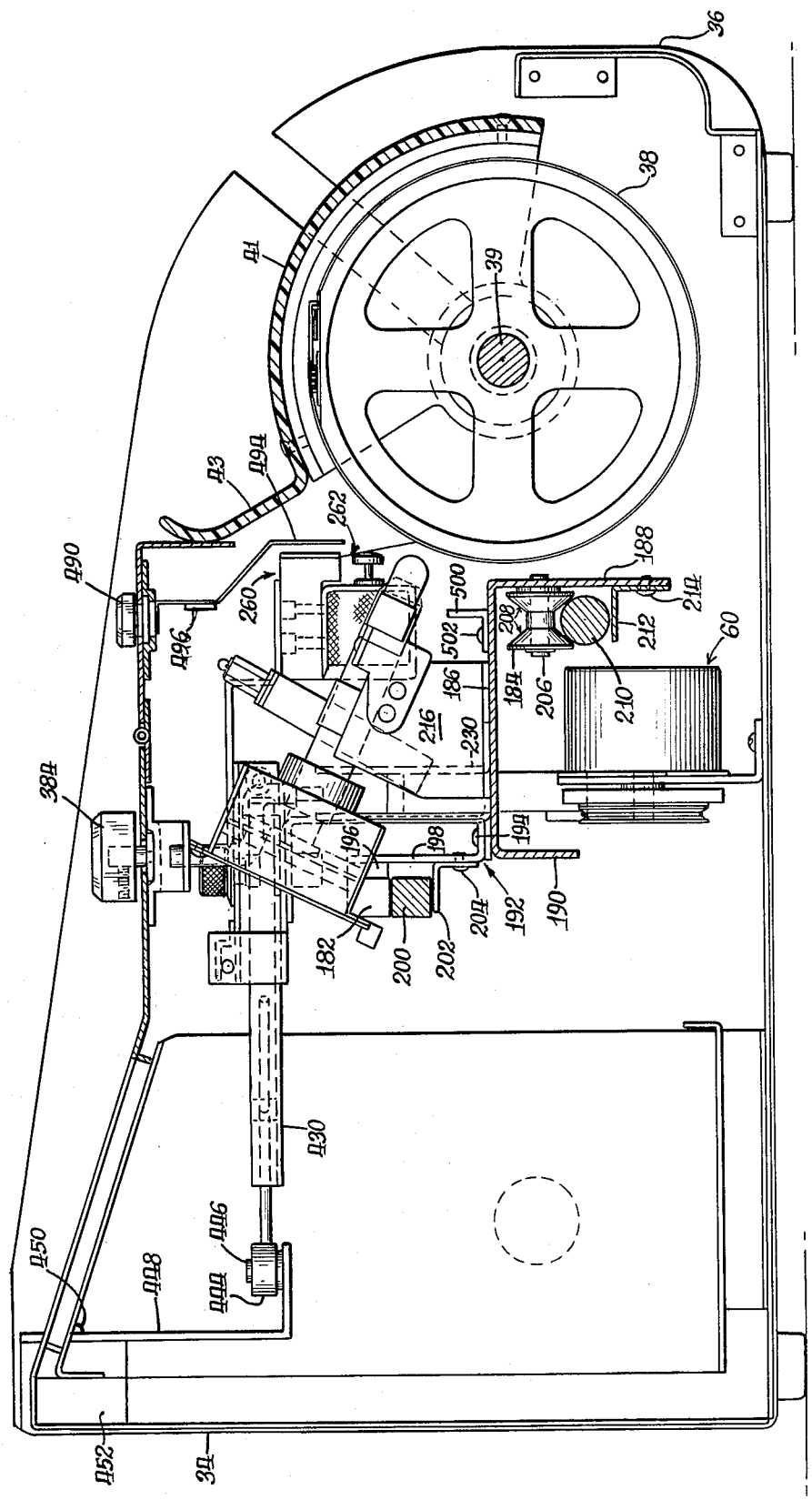

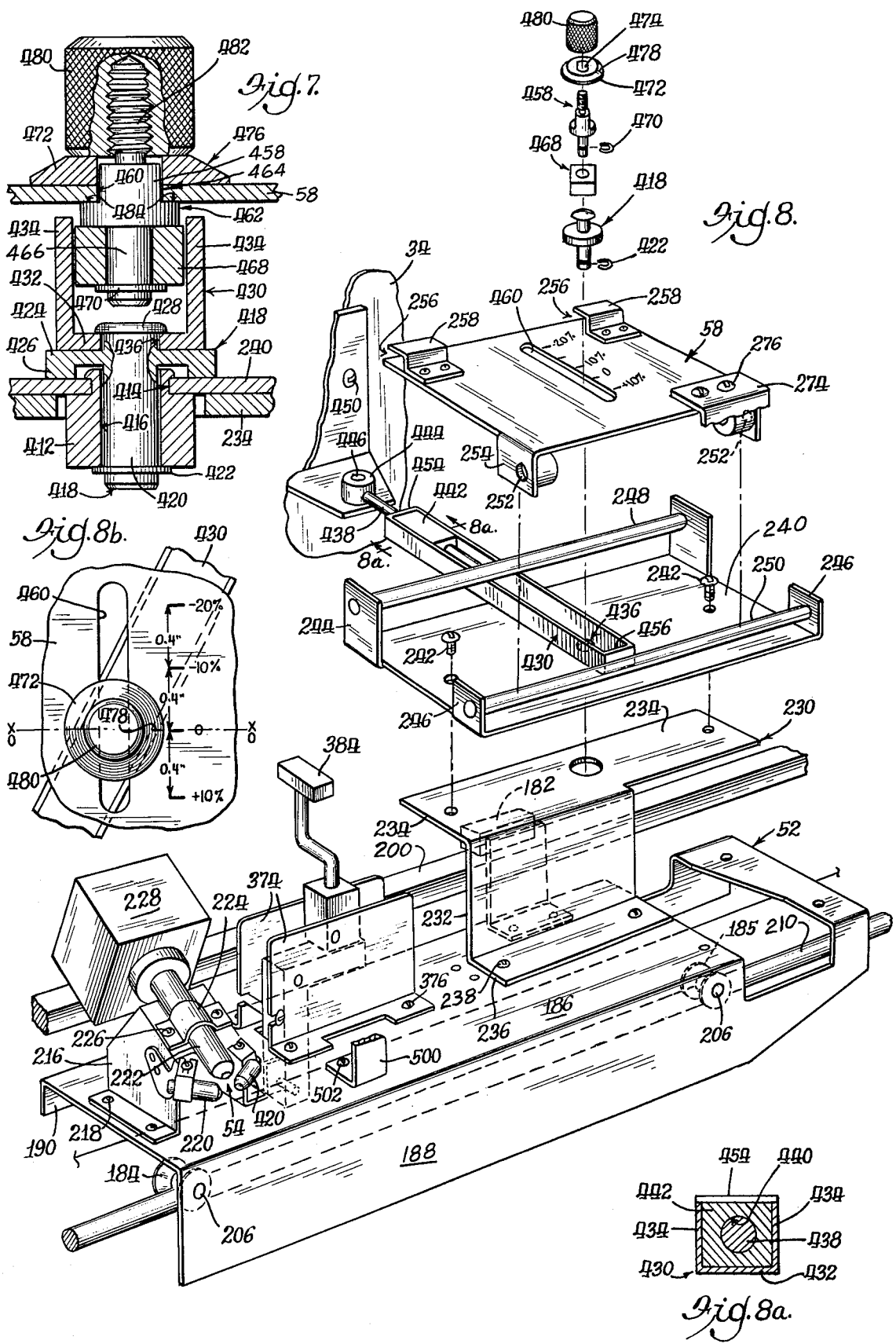

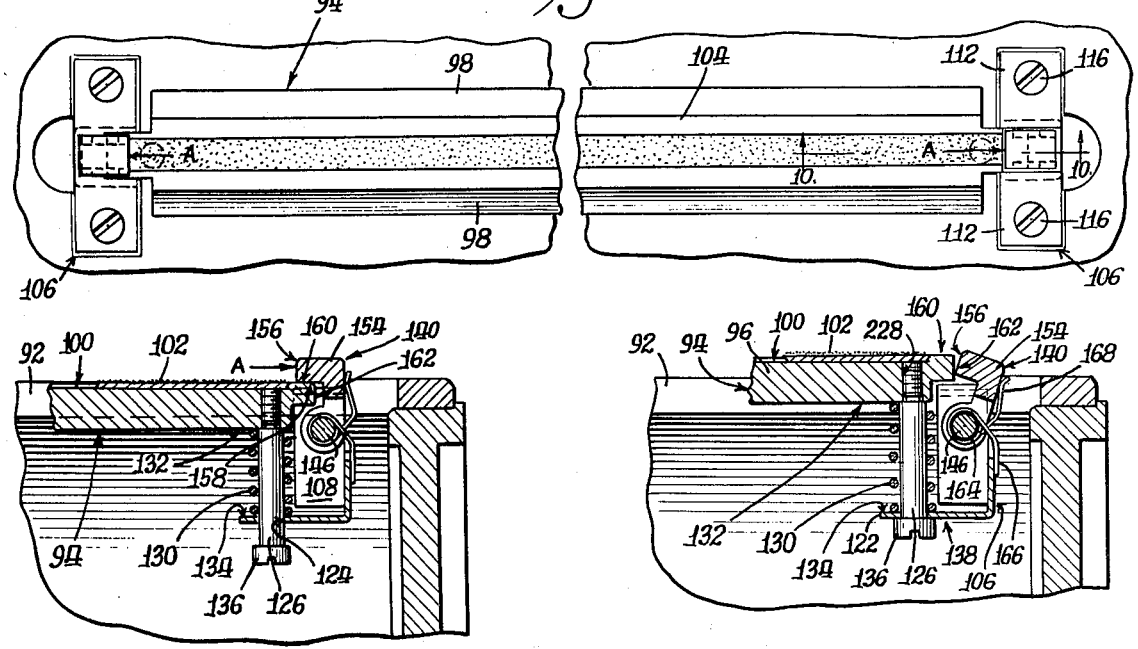
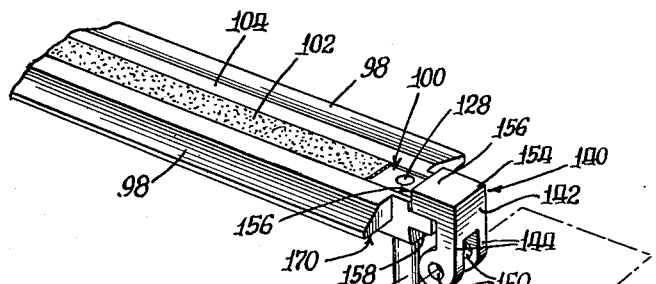
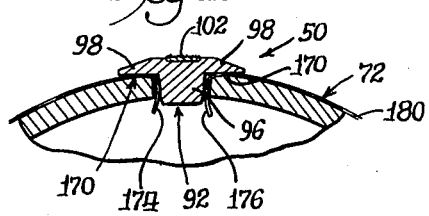
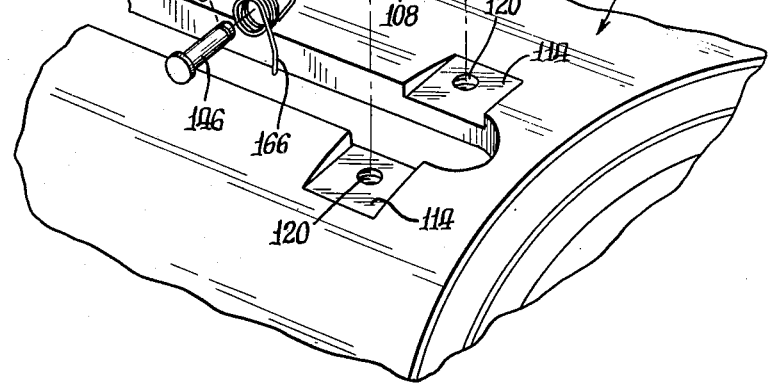

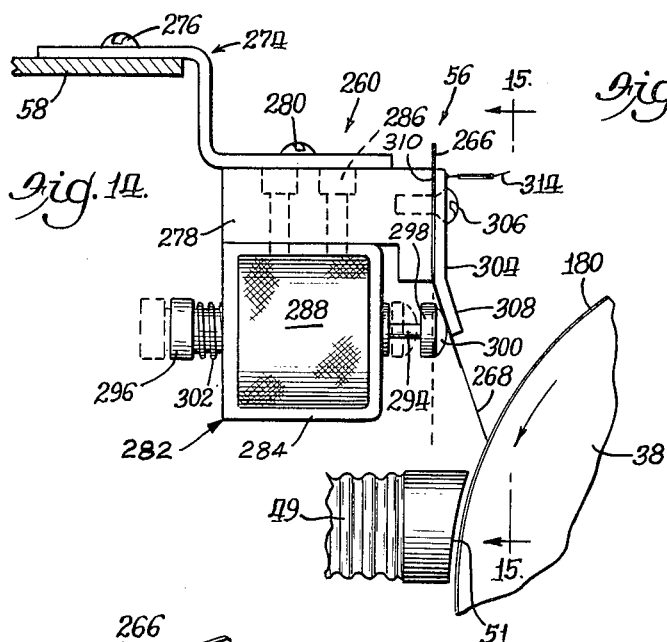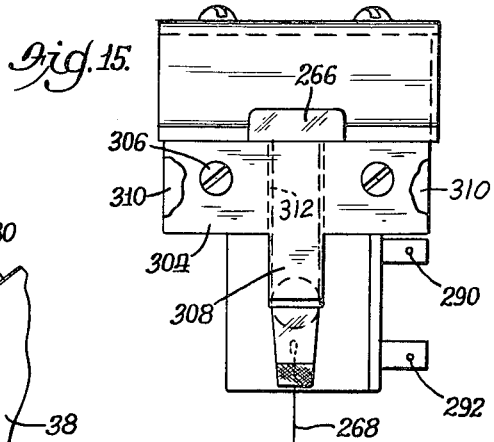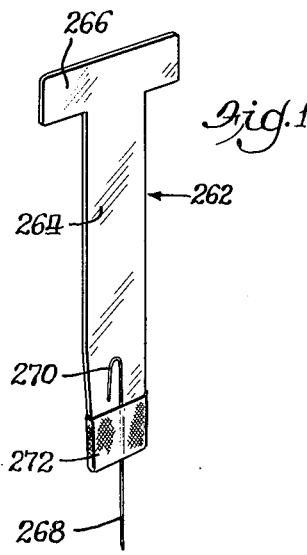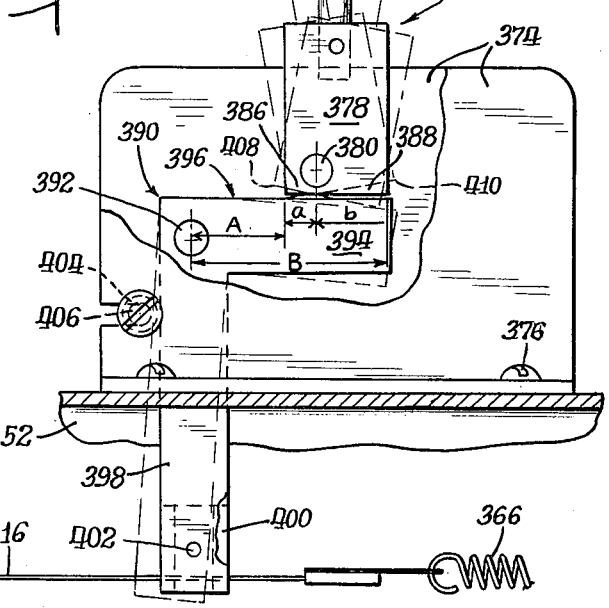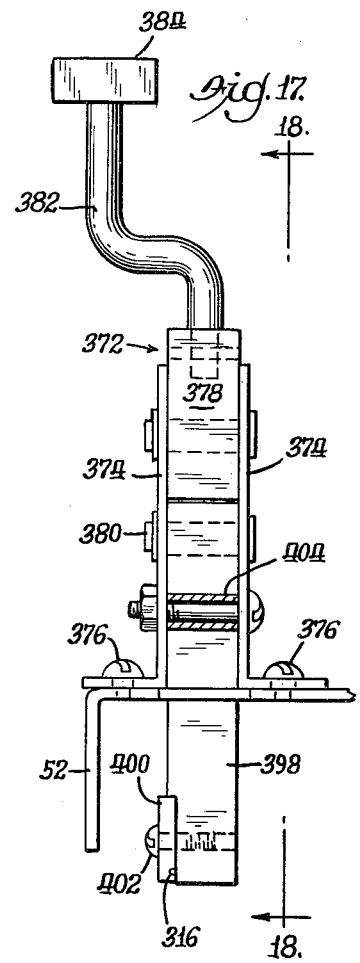

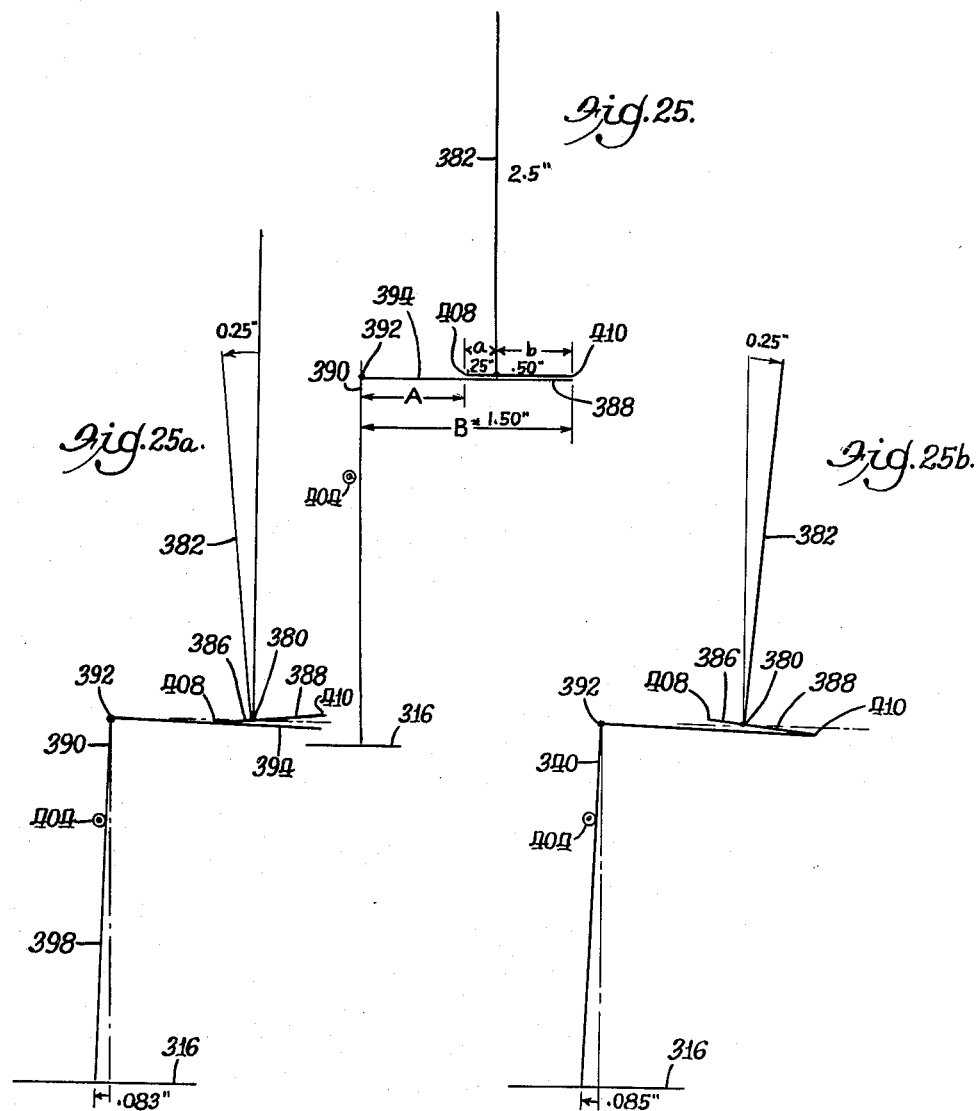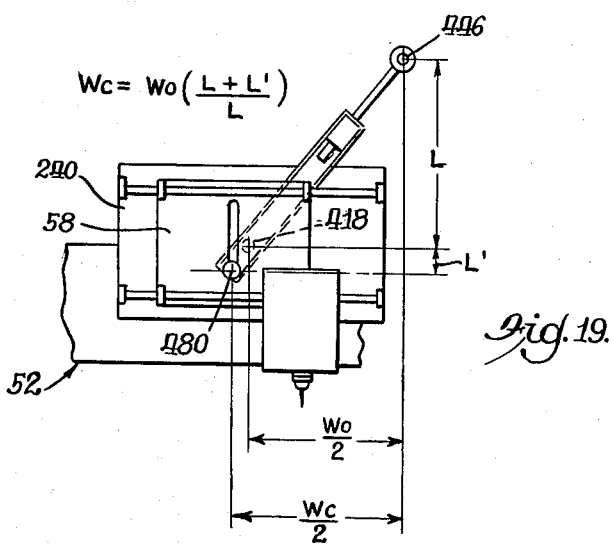

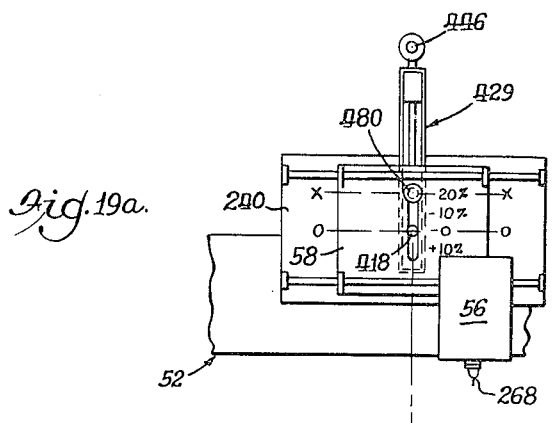
Fig.19a.
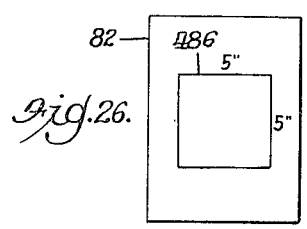
Fig.26.
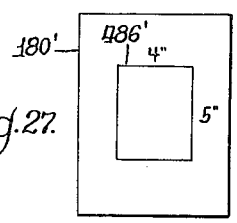
Fig.27.
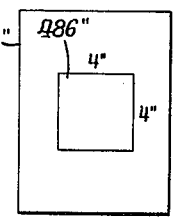
Fig.28.
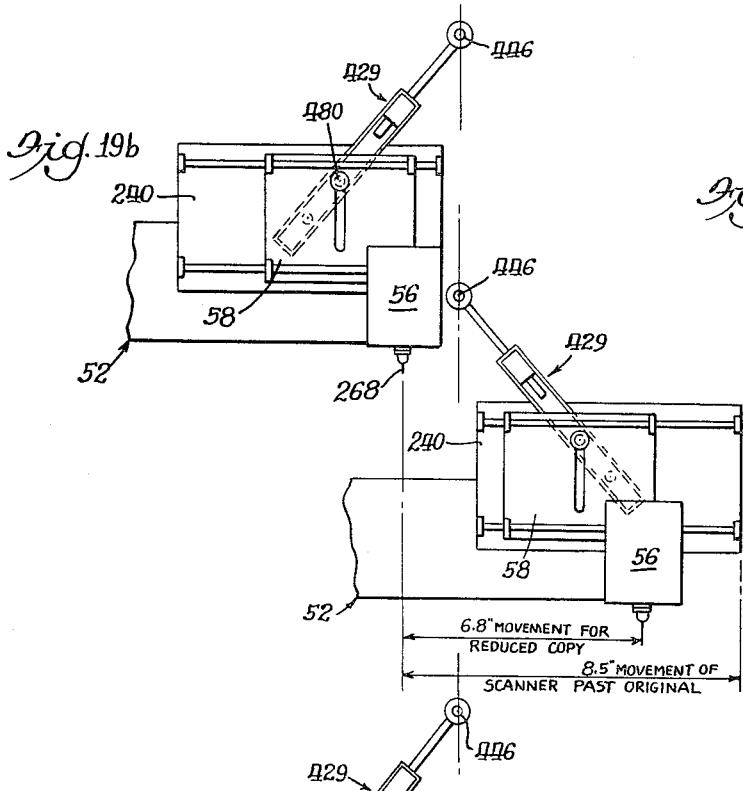
Fig.19b.
Fig.19c.
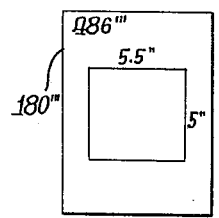
Fig.29.
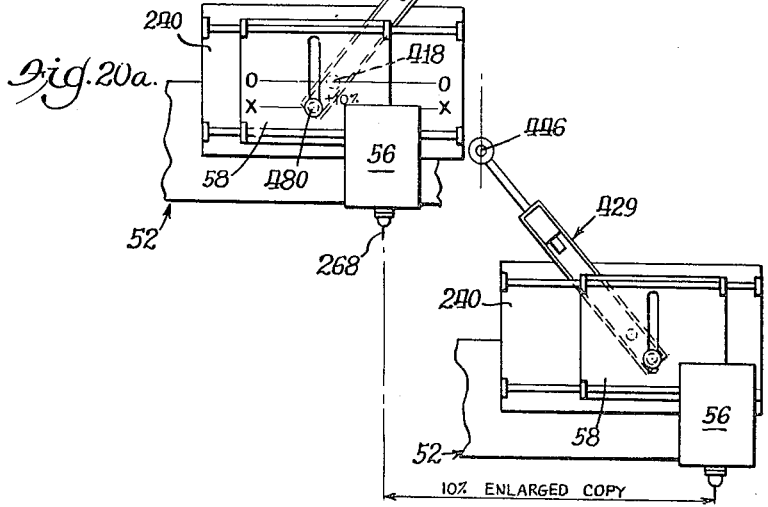
Fig.20a.
Fig.20b.

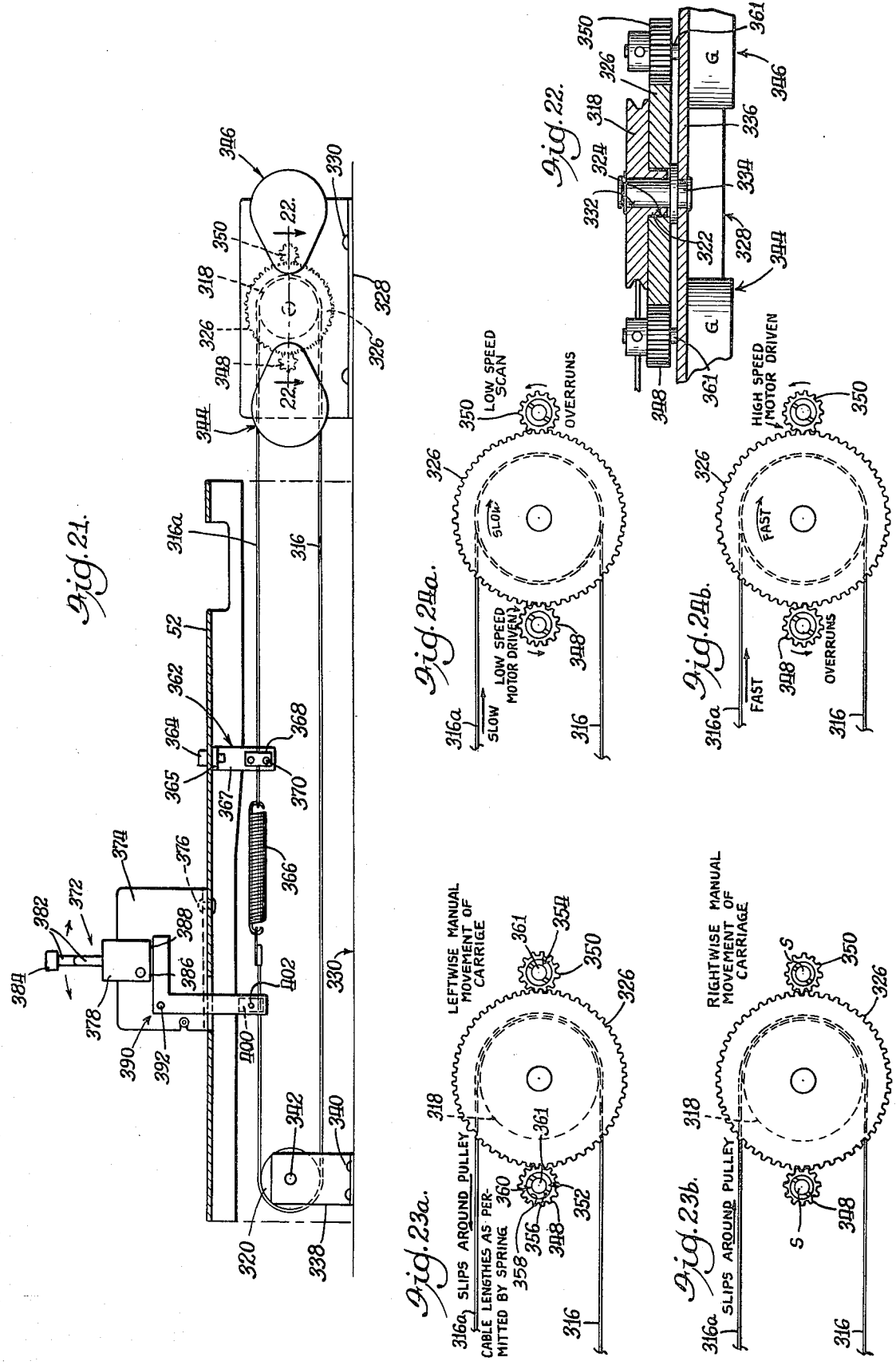

ELECTRONIC STENCIL CUTTER

RELATED APPLICATION

This application is a division of application Ser. No. 77,160 filed Sept. 20, 1979 which itself was a division of application Ser. No. 894,528 filed Apr. 10, 1978.

BACKGROUND AND SUMMARY OF THE INVENTION

This invention relates generally to apparatus for transferring a printed, written, or pictorial image from an original subject sheet to a master stencil sheet for use in making multiple copies of the image in a printing or duplicating machine. More particularly, it relates to apparatus sometimes referred to as an electronic stencil cutter, although it will be apparent as the description proceeds that certain novel features of the invention may usefully be employed in printing and duplicating apparatus other than for the stencil process.

The simplest and most widely used apparatus of this kind has a rotatable drum with means for mounting the original subject sheet and the stencil sheet side by side. A scanning head and a cutting head are supported on a carriage alongside the original subject sheet and the stencil sheet respectively. The scanning head includes a light source, an optical pickup focused on the subject sheet, and a photo-sensitive element which senses variations in light intensity of the image on the subject sheet. The cutting head has a perforating stylus with a very fine wire electrode pressed against the stencil sheet which has a special electrically conductive layer therein. A high voltage electrical circuit generates sparks at the point of contact between the electrode and stencil sheet. These sparks are synchronized with variations in light intensity reflected from the original image and thereby reproduce that image as holes burned in the stencil sheet.

The stylus current which generates the spark is inversely proportional to the intensity of the light reflected from the pattern on the original. That is, a bright reflection from a white or light background area on an original subject sheet produces no spark between the wire electrode and the stencil sheet, and no hole or holes are made in the stencil sheet. Conversely, dark printed areas or lines on the original sheet produce sparks at the end of the electrode and burn holes through the corresponding areas in the stencil sheet. Later, during printing or duplicating, ink is squeezed through these holes onto copy sheets to reproduce the original dark areas exactly.

During the stencil-cutting process the drum is rotated while relative movement lengthwise of the drum is effected between the drum and the carriage supporting the scanning and cutting heads. U.S. Pat. Nos. 2,705,259; 3,006,992; 3,396,294; 3,801,738; and 3,823,262 show the general state of the art of electronic stencil cutters. In some of those patents, the drum is rotated while the scanning or cutter heads are moved along the drums. In others, the drum is rotated and moved axially while the heads remain stationary. Due to the simultaneous rotation of the drum and axial advance of the scanning and cutting heads relative to the drum, the original sheet is scanned along a helix, and the stencil sheet is perforated along an identical helix for same-size reproduction. The speed of advance is adjustable in many machines so that the pitch of the helical scanning and cutting can be varied. A low speed of relative axial advance results in perforation lines being close together and provides a high quality, fine, detailed reproduction, excellent for copying art work or photographs where the time required can be justified. With a higher speed advance, the perforation lines are farther apart but produce excellent stencils for copying printed matter such as menus, letters, and memos, and it requires less time.

Previously known electronic stencil cutters have a serious limitation because they can make only same-size stencils. Most standard office duplicating machines will not copy a full 8½" wide because they use spring steel hold-down guides or strippers along the side edges of the copy sheets as the latter are fed across the stencil drum. Examples are strips 375 (shown in FIGS. 2 and 3 of Springer U.S. Pat. No. 3,835,772). These strips reduce the usable printable width of an 8½" wide copy sheet to about 8" or less. If the original image is wider, as for example on a so-called "bleed" page where it extends right out to the edge, the original must be photostatically reduced before the stencil is made from it for use in these previously known duplicating machines.

As stated, previously known electronic stencil cutters have mechanism for varying the speed of advance of the scanning and cutting heads along the drum, or vice versa. One such mechanism is a motor-driven screw, threadedly engaging the movable part, the speed of advance being varied by changing the rotational rate of the screw through change-gears or clutches. Another such mechanism advances the movable part by means of cams or rollers bearing against the outer surface of a smooth rod, and the speed of advance is varied by changing the angle of contact against the rod; one such arrangement being shown in U.S. Pat. No. 3,396,294.

These are complex, costly, and imprecise, particularly in view of the special requirement for this apparatus that the motor drive means be manually overrideable, for example, when the operator moves the scanning head manually to the left hand edge of the image on the original subject sheet at the start of a stencil-cutting procedure. Another problem in this known apparatus is that the stylus assembly in the cutting head vibrates when it strikes the leading edge of the stylus sheet, once each rotation. Although the stylus is an expendable item, replaced frequently as the wire electrode burns short, conventional styluses are relatively costly because they comprise a multi-layer metal-and-plastic lamination, and each is made with a special vibration-dampening element which is thrown away with the stylus when it is replaced.

Still another problem in known electronic stencil cutter apparatus is the mechanics of clamping the original subject sheet and the stencil sheet onto the drum. In conventional apparatus, these sheets are held by complicated, cumbersome, and costly arrangements of levers and clamps.

SUMMARY OF THE INVENTION

It is a general object of the present invention to provide an electronic stencil cutter with a number of specific improvements over previously known apparatus of this kind.

One object is to provide an electronic stencil cutter apparatus which is adjustable to cut a stencil image smaller or larger than the original subject image according to a selection readily made by the operator.

Another object is to provide such apparatus which is adjustable to reproportion the image by selectively reducing or enlarging the width of the image or margins on the stencil sheet while reproducing the height at the same size.

Another object is to provide such apparatus with an improved, readily manually overrideable mechanism for varying the speed of advance of the scanning and cutting heads relative to the drum. Specifically, the carriage on which the heads are mounted is connected to a cable wrapped about a drive pulley which is driven by a plurality of different-speed motors, all connected to drive the pulley cable through individual overrunning clutches, each motor being selectively energizable to drive the pulley and move the carriage through the cable at a speed determined by the particular motor energized, while the overrunning clutches associated with the other motors free wheel. The cable is automatically releasable from the drive pulley when the operator moves the carriage by hand.

Another object is to provide such apparatus with an improved perforation stylus holder which enables use of an inexpensive, non-laminated, all-plastic stylus, inasmuch as the holder itself, in the present invention, incorporates an effective vibration-dampening element, making it unnecessary to provide a separate vibration-dampening element such as the loose rivet or rivets conventionally used on each stylus.

Another object is to provide a simplified and effective original subject sheet holder which eliminates all the levers and clamps conventionally used for this purpose; specifically the original subject sheet holder in the present invention is a flexible, transparent retainer sheet wrapped about the drum, one end being fixed to the drum and the opposite, free end having a pressure-sensitive adhesive strip which is attachable to and releasable from a similar strip on the drum.

Another object is a simple and effective bar clamp which simultaneously holds both ends of a stencil sheet on the drum and which is readily releasable when the stencil sheet is changed.

GENERAL DESCRIPTION OF THE DRAWINGS

Other objects and advantages will be apparent from the accompanying drawings in which:

FIG. 1 is a perspective front view of an electronic stencil cutter illustrating a preferred form of the present invention;

FIG. 2 is an enlarged fragmentary cross-sectional view of FIGS. 1 and 5, taken on lines 2—2, showing details of the improved original copyholder in closed position;

FIG. 3 is a view similar to FIG. 2 showing the initial opening or final closing movement of the transparent retainer sheet member as part of the procedure for removing or replacing an original copy sheet;

FIG. 4 is a fragmentary longitudinal cross-sectional view of the drum showing portions of an original subject sheet 82 from which an image is cut on a stencil sheet 180;

FIG. 6 is a vertical cross-sectional view of FIG. 5;

FIG. 7 is a fragmentary enlarged vertical cross-sectional view of FIG. 5 taken along line 7—7, showing details of the adjustment knob 480 and associated parts of the width control mechanism;

FIG. 8 is an exploded perspective view of the major components of the width control mechanism;

FIG. 8a is a fragmentary cross-sectional view of FIG. 8 taken on line 8a—8a;

FIG. 8b is a fragmentary enlarged view of FIG. 5;

FIG. 9 is a fragmentary enlarged view of FIG. 5 showing details of the stencil holder;

FIG. 10 is a fragmentary cross-sectional view of FIG. 9, taken on the line 10—10, showing the stencil holder in clamped or closed position;

FIG. 11 is a view similar to FIG. 10 showing the stencil holder in unclamped or open position;

FIG. 12 is an enlarged fragmentary cross-sectional view of FIG. 5 taken on line 12—12;

FIG. 13 is a fragmentary, perspective, exploded view of the major components of the stencil holder shown in the previous views;

FIG. 14 is a fragmentary enlarged view of FIG. 5, taken along line 14—14 showing details of the improved stylus holder;

FIG. 15 is a view of FIG. 14, taken in the direction of the arrows 15—15;

FIG. 16 is an enlarged perspective view of the stylus forming part of the assembly shown in FIGS. 14 and 15;

FIG. 17 is an enlarged vertical cross-sectional view of FIG. 5 taken approximately along line 17—17;

FIG. 18 is a view of FIG. 17 taken in the direction of the arrows 18—18;

FIG. 19 is a schematic plan view of the width control mechanism with dimensions identified, which are significant in determining original-to-copy ratios;

FIGS. 19a, 19b and 19c are schematic plan views of the width control mechanism similar to FIG. 19, set for a 20% reduction of the image on the stencil sheet, FIG. 19a showing the centered position, and FIGS. 19b and 19c showing lefthand and righthand positions;

FIGS. 20a and 20b are similar to 19b and 19c respectively, set for a 10% enlargement;

FIG. 21 is an enlarged, vertical, longitudinal cross-sectional view of FIG. 5 showing the motor-driven scan-rate control mechanism, and manual override mechanism therefor;

FIG. 22 is an enlarged cross-sectional view of FIG. 21 taken along the line 22—22;

FIGS. 23a and 23b are fragmentary enlarged views of FIG. 21 illustrating manual override of the motor-driven scanning mechanism;

FIGS. 24a and 24b are views similar to FIGS. 23a and 23b illustrating low speed and high speed motor-driven scan operations;

FIG. 25 is a schematic diagram of the manual override mechanism shown in FIGS. 17, 18 and 21;

FIGS. 25a and 25b are views similar to FIG. 25 showing the manual override mechanism in opposite operative positions; and FIGS. 26, 27, 28 and 29 are views of original and stencil sheets with images illustrating different steps in the cutting of stencils and showing an image re-sized in different ways.

Like parts are designated by like reference numbers throughout the figures of the drawings. Like parts are referred to by like reference characters throughout the figures of the drawings.

DETAILED DESCRIPTION OF THE PREFERRED EMBODIMENT

General Description of the Overall Machine

Figure 5:
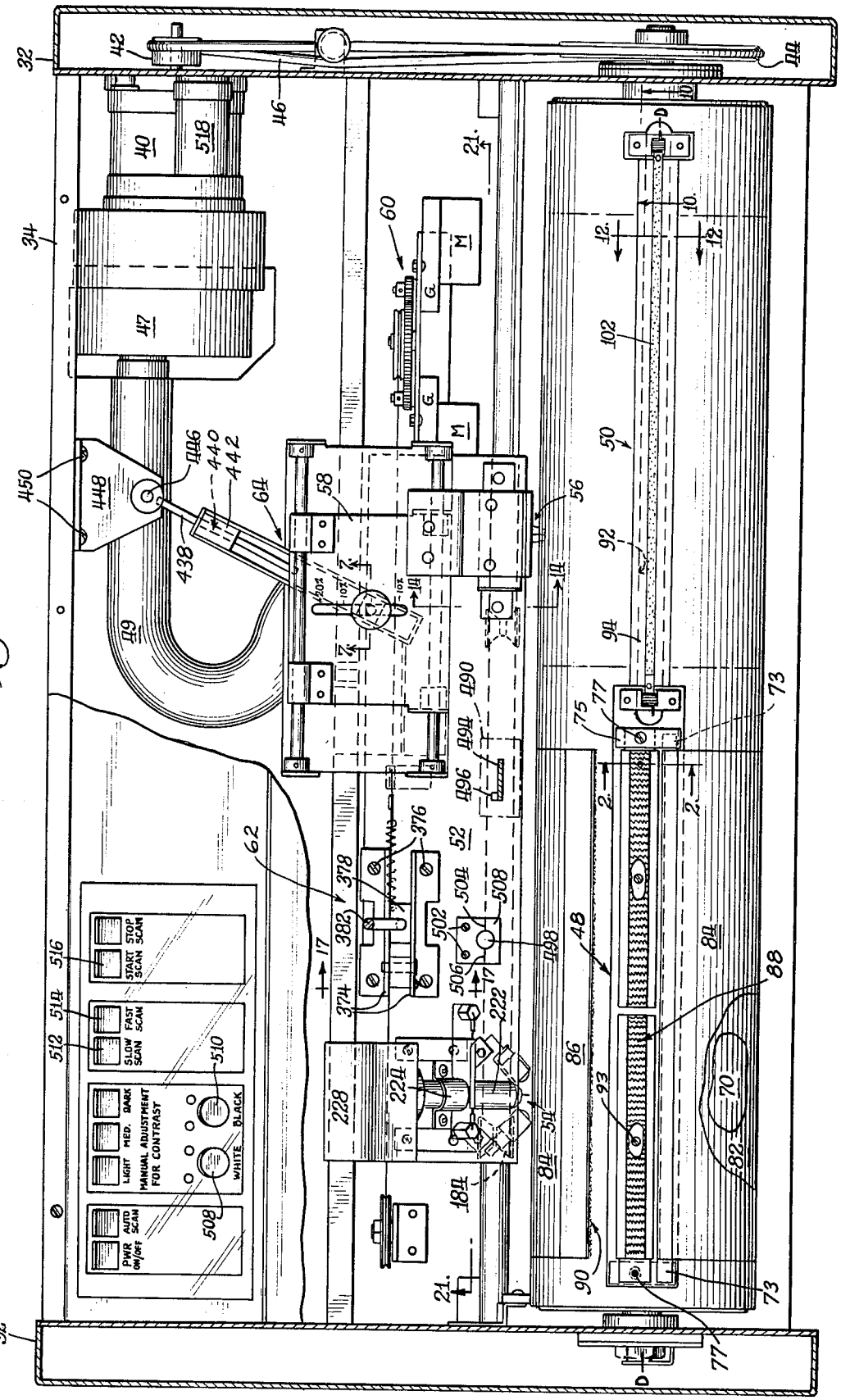
FIG. 5 is a top plan view of the machine shown in FIG. 1 with portions cut away and cross-sectioned to better show the overall arrangement.

A preferred embodiment of the invention, as shown in the drawings, will first be described in a general way to facilitate an overall understanding of the machine. Then, the components will be described in detail, emphasizing the novel features.

The electronic stencil cutter comprises a frame, generally designated 30, having a pair of side plate members 32, 32, suitably interconnected by cross-bracing members, two of which are back and front walls 34 and 36. A drum 38 is mounted on a shaft 39 which is rotatably journaled in the frame and is driven by a motor 40 through pulleys 42, 44, and belt 46. Motor 40 also drives a suction fan 47 which draws dust and cuttings through a flexible tube 49 from an area immediately below the stencil cutting operation, as will be described. A formed cover plate 41 of transparent plastic (seen in cross section in FIG. 6) is mounted for rocking movement about shaft 39. The lip 43 may be pulled forwardly, to roll the cover down onto the housing and thereby provide access to the drum for loading and unloading. A holder 48 is provided on the left side of the drum to hold an original subject sheet. Another holder 50 is provided on the right side of the drum to hold a stencil sheet. A carriage 52 is movable, sidewise of the machine, back and forth along the drum 38. A scanning head 54 is mounted on the carriage opposite the original subject sheet holder 48. A cutting or copying head 56 is mounted opposite the stencil sheet holder 50 and is carried on a top slide 58 which, in turn, is slidably mounted on the carriage. The carriage is moved at a selected scan speed from left to right along the drum by motor-driven scan rate control apparatus 60, this being manually overrideable by manual override mechanism 62. Copy size control mechanism 64 is adjustable to modify movement of the cutting head relative to the scanning head to cut an image on the stencil sheet at the same size as the image on the original subject sheet, or to reduce or enlarge it as selected by the operator.

Original Subject Sheet Holder

The original subject sheet holder 48 retains an original subject sheet 82 wrapped about the cylindrical surface of the drum in position to be scanned by the head 54, for transfer to the stencil sheet. Preferably, the holder 48 will be recessed below the cylindrical surface 72 of the drum, as shown in FIGS. 2, 3 & 4. A flat, chordal, external surface 66 on the outside of the drum provides such a suitable recess 68. For scanning purposes, the original subject sheet 82, in use, will be interposed between a base or backing sheet 70 and a clear plastic retainer sheet 84. As best shown in FIGS. 2 & 3, one each each of the backing and retainer sheets are permanently crimped into a folded metal holder 71 which is simply an elongated metal strip folded over twice to grip the ends of the sheets 70 and 84 as shown. Each end 73 of the metal strip (as shown in FIG. 5) extends beyond the side edges of the sheets.

A pair of narrow, inverted U-shaped straps 75 are fastened to the drum by cap screws 77. Each strap has an elongated body 79 and a pair of legs 81 holding the body spaced outwardly from the chordal drum surface 66.

The ends 73 of the folded metal holder 71 are retained loosely beneath the straps 75. This enables the retainer sheet 84 to pull the original sheet 82 and backing sheet 70 snugly, wrinkle free, against the periphery of the drum.

The backing sheet 70 preferably will be made of strong plastic or plasticized paper printed with guidelines (not shown) to facilitate rapid positioning and centering of an original subject sheet 82 between the backing and retainer sheets. One plastic material which is flexible, long lasting, and quite suitable for the retainer sheet is Mylar.

A reinforcing tape 86 is adhered to the free end of the retainer sheet 84, as shown in FIGS. 2 & 3.

The chordal surface 66 on the drum, and the free end portion of the retainer sheet 84 beneath the tape 86 have releasable, mutually-adherent fastener members 88 and 90 of the so-called loop and hook type. These consist of loop-like fiber elements 83 in member 88 and hook-like fiber elements 85 in member 90. Fastener member 90 includes a fabric mounting strip 87 which may be attached to the retainer sheet 84 by a suitable adhesive. These hook-like and loop-like elements may be reversed. These are pressure-sensitive in that they cling and adhere tightly to one another when pressed together but are repeatedly, manually separable by pulling outwardly on the free end of the retainer sheet 84. This type of fastener is sometimes referred to in the trade as "Velcro" and is described in detail in U.S. Pat. Nos. 2,714,437; 3,099,235; and 3,562,044.

Fastener member 88 comprises the above mentioned loop-like elements 83 mounted on a fabric strip 89 which may be similar to strip 87. Strip 89 is held within a clamp 91 which in the present case is an elongated metal strip having the side edges folded up and over the edges of the fabric strips 89 to leave the loop-like elements 83 exposed as shown. Each drum has a pair of clamps 91 and a pair of strips 89 therewithin; these are aligned, and meet midway between the locations of straps 75 as shown in FIG. 5.

Each clamp 91 is held in place by three screws 93 as best shown in FIGS. 2 & 5. Each clamp 91 has an end tongue 95 which extends into the space beneath the corresponding U-shaped strap 75. Each tongue 95 has a bolt hold 97 through which the corresponding cap screw 77 extends.

In use, the original subject sheet holder 48 is opened by grasping the end of the retainer sheet 84 and pulling outward on it to release the fastener member 90 from fastener member 88. The original subject sheet 82, with the image to be copied, is then placed on the backing sheet 70 and the member 90 is pressed firmly against the member 88 until the hook and loop elements are interengaged.

The ends 73 of the folded metal clamp 71, which hold one end each of the backing and retainer sheets, are limitedly free to shift within the space beneath the straps 75. The opposite ends of the backing and retainer sheets 70 and 84 are completely free as best shown in FIG. 3. This enables flat, wrinkle-free disposition of the original subject sheet 70 about the drum.

While the folded metal clamp means 71 is normally parallel to the axis of the drum 38, it is limitedly angularly adjustable beneath the straps 75 when the retainer sheet is tensioned incidental to pressing the loop and hook elements 83 and 85 together.

The ability of this clamp to shift even slightly, when the retainer sheet is tensioned, compensates for any slight out-of-square shape of the retainer sheet and avoids unnecessary and costly manufacturing precision in fastening the fixed ends of the backing and retainer sheets exactly parallel to the drum axis. Further, this construction enables ready replacement of the backing and retainer sheets simply by loosening one of the screws 93 and inserting the end-tongues 95 of a new sheet clamp beneath the straps 75.

Stencil Sheet Holder

The stencil sheet holder 50, on the righthand end portion of the drum, is best shown in FIGS. 5 and 9 through 13. The cylindrical wall of the drum is formed with an elongated slot 92 parallel to the central axis D—D (FIG. 5) of the drum.

An elongated clamp bar 94 is of a size and shape to fit within the slot 92. As shown in cross-section in FIG. 12, it comprises an elongated body part 96 which fits within the slot, and a pair of elongated flanges 98, 98 which, in the closed position, press on the outer surface 72 of the cylinder. Along the outside surface of the clamp bar, there is a groove 100 within which is adhered an abrasive strip 102. This may, for example, be a strip of fine-to-medium-grade sandpaper or emery cloth. The abrasive outer surface preferably extends slightly outwardly beyond the outer surface 104 of the clamp bar for the purpose of dressing a stylus wire electrode while the drum rotates, as will be explained.

Guide means is provided on the drum to support the clamp bar 94 for movement between a closed, latched position within the slot 92, as shown in FIGS. 10 and 12, and an open, unlatched position as shown in FIG. 11. As best shown in FIG. 13, this guide means includes a bracket 106 mounted at each end of the slot 92 on the drum. Each bracket illustrated here is made of sheet metal formed with a pair of spaced, parallel, side sections 108, 108 interconnected by a bridge section 110. The outer end portions of side sections 108 are out-turned to provide a pair of ears or tabs 112 which are seated on chordal flat surfaces 114, recessed and formed within the cylindrical drum surface 72. Each bracket is removably assembled by cap screws 116 which extend through openings 118 in the tabs 112 into threaded bores 120 in the cylindrical wall. The inner end of each bridge section 110 is offset laterally from it to provide an internal shoulder 122 having a circular opening 124. A pair of slide shafts consisting of bolts 126, 126 extend through the circular openings 124. The outer ends of these bolts are threadedly engaged with screw-threaded bores 128 in the clamp bar. Helical compresssion springs 130 encircle the bolts 126 and their opposite ends are seated respectively on the inner surface 132 of the clamp bar and the outer surface 134 of the shoulder 122. Thus the springs 130 urge the clamp bar 94 in a radially outward direction, the bolt heads 136 serving as outer limit stops by engaging the inner surfaces 138 of the shoulders 122 in the open unlatched position of FIG. 11.

A pair of latch members 140, 140 are provided to hold the clamp bar 94 in the closed, latched position of FIGS. 10 and 12. Each latch member comprises a body section 142 with bifurcated inner end portions 144, 144, pivotally supported on a corresponding one of the brackets 106. A pivot rod 146 extends through apertuers 148 and 150 in the bracket and latch members respectively. The pivot rod is retained by a spring C-washer 152. The outer end of each latch member has a head 154 offset laterally toward the clamp bar. Each head has an end portion 156 with a bottom surface 158 engageable with a top surface 160 of the clamp bar to hold the latter is the closed, latched position of FIG. 10. The end portion 156 of each head is engageable with a corresponding side surface 162 of the clamp bar, as best shown in FIG. 11. Specifically, in the present case, the side surface 162 is at each end of the clamp bar and the latch member end portion 156 is slidably abutted therewith in the open, unlatched position of FIG. 11.

A second spring means 164 urges each latch member 140 about its pivot rod 146 for swinging movement toward the latched position of FIG. 10. This spring means is illustrated as a torsion spring 164 with opposite ends 166 and 168 pressing leftwise (in FIGS. 10 and 11) against the bracket portion 110 and the latch member 140.

In the open, unlatched position shown in FIG. 11, the end portion 156 of the latch member abuts the smooth side surface 162 at the end of the clamp bar. In this open position, there are spaces between the inner surfaces 170, 170 of the clamp bar flanges 98 and the outer drum surface 72. These spaces are large enough to insert the opposite ends 174 and 176 (FIG. 12) of the stencil sheet 180. When the ends are so inserted, it is necessary only to press the clamp bar 94 radially inwardly against the springs 130 until the latch members 140 swing inwardly to the closed, latched position shown in FIG. 10. At this time, the stencil sheet ends are clamped tightly beneath the flanges 98 as shown in FIG. 12.

To open the clamp bar and release the stencil sheet, it is necessary only to press the latch members to the right and left respectively, i.e., in the direction of the arrows A, A in FIGS. 9 and 10. The clamp bar is then moved automatically outwardly by springs 130 to the open position shown in FIG. 11. This releases the stencil sheet 172 for removal or replacement.

Stylus Holder

Before describing the improved stencil cutting stylus and stylus holder, related components will first be described to provide background information.

As shown in FIGS. 5, 6 and 8, carriage 52 is mounted for side-to-side movement parallel to the axis D—D of the drum 38 on a three-point support consisting of a slide block 182 and a pair of concave V-groove rollers 184 and 185. As best shown in FIGS. 6 and 8, the carriage 52 has the shape of an inverted U-channel comprising a horizontal web 186 and front and rear depending flanges 188 and 190. An upstanding L-shaped bracket 192 is fastened on the rear of the carriage by screws 194. The slide block 182 and a spacer 196 are fastened to the rear of the vertical leg 198 of that bracket. Slide block 182 is slidably supported for movement along the top of square cross-section rail 200 which, in turn, is supported at its ends on the side plate members 32. A keeper bracket 202 is also fastened to the rear of vertical leg 198 by screws 204. By engaging the underside of rail 200, it prevents upward displacement of the rear part of the carriage 52.

Rollers 184 and 185 are mounted on shafts 206, fastened on the rear side of carriage flange 188. Each roller has a pair of conical surfaces 208, 208 engaging a circular cross-section rail 210 to prevent forward and rearward movement of the carriage while supporting it for movement parallel to the drum. A keeper bracket 212 is also fastened to the rear of flange 188, by screws 214. It engages the underside of rail 210, preventing upward displacement of the front part of the carriage 52.

The scanning head 54 forms no part of the present invention so will not be described in detail. Briefly it comprises a bracket 216 mounted by screws 218 on the carraige. A pair of lamps 220 illuminate the immediate area being scanned on the original subject sheet 82. A micro-optical unit 222, fastened by strap 224 and screws 226 to bracket 216, focuses on a tiny spot on the original subject sheet and senses light and dark areas, which information is processed in a control box 228 producing signals which are fed to the cutting head 56 in the usual way by known circuitry, not shown.

Referring to FIGS. 5, 6 and 8, a Z-shaped bracket 230 is mounted on, and movable with, the carriage 52. This bracket has a vertical web 232 and a pair of oppositely-directed flanges 234 and 236, the latter being fastened to the carriage by screws 238. A copy width control base 240 is fastened to the top side of flange 234 by screws 242. Upturned tabs 244, 244 and 246, 246 on the base 240 support slide rods 248 and 250 respectively.

As previously described, the cutting or copying head 56 is carried on top slide 58 and is movable by the carriage. The top slide 58 is slidably supported on rods 248 and 250. Rod 250 extends through apertures 252 in downturned tabs 254 of the top slide member. Rod 248 extends through the gaps 256 between the top slide member 58 and rear guide brackets 258 attached thereto. As will be described in connection with the copy size control mechanism 64, to be covered in detail, the movable top slide 58 enables the cutting head 56 to be moved along the drum at a speed which differs, either faster or slower, as selected, from that of the scanning head 54. This enlarges or reduces the image cut on the stencil sheet relative to the image on the original subject sheet.

Refer now to the improved stylus holder 260 and stylus 262 shown in FIGS. 14, 15 and 16. The stylus itself is sometimes called a perforation electrode; for example, see FIG. 8 of U.S. Pat. No. 3,396,234 showing a conventional form.

The stylus 262 comprises an elongated, flat, bladelike body member 264 made of flexible electrical insulating material such as polystyrene. It is T-shaped, with a bar 266 across the top serving as a handle and limiting the position of the stylus when inserted in the holder, as will be described. A thin wire 268 of tungsten, or other heat-resistant electrical conductor, is crook-shaped, having a doubled section 270 laid flat against the plastic body and adhered in place in any suitable manner, for example by an elastic tape 272 or by epoxy. In use, the straight end portion 268 extends from the end of the plastic body and slides across the stencil sheet during rotation of the drum. The doubled section 270 provides a widened base to improve electrical contact with the stylus holder which will now be described.

A Z-shaped bracket 274 is fastened to the top slide 58 by screws 276. An electrical insulating block 278 is fastened to the underside of bracket 274 by screws 280. A solenoid 282 has a frame 284 held to the block by bolts 286. A solenoid coil 288 is supported within the flame and is suitably energized through electrical leads 290, 292 (FIG. 15) by a control circuit, not shown.

The solenoid has a plunger 294 with rear and forward heads 296 and 298 respectively. An important feature of the stylus holder, which effectively dampens stylus vibration, is a nose cone 300 of soft felt-like material. A coil spring 302 is interposed between the rear head 296 and the frame, urging the plunger rearward to the broken line position, shown in FIG. 14, when the coil is not energized. At such time, the elastic stylus body assumes a straight position also shown in broken lines in FIG. 14. When the solenoid coil is energized through the conductors 290 and 292, the plunger is pulled forward.

At the front of the block 278, there is a T-shaped (FIG. 15) contact plate 304 of electrically conductive metal. It is held by screws 306 and has a forwardly-inclined lower tongue portion 308 which serves to train the flexible stylus forwardly at a proper angle to contact the stencil sheet 180 on the drum 38 when the solenoid is energized, as shown in solid lines in FIG. 14. This causes the forward head 298 and the felt nose cone 300 to move forward and press the stylus against the lower tongue portion 308 to deflect it as described and shown.

As shown in FIGS. 14 and 15, spacer sheets 310 of a thickness slightly more than the stylus body 264 are interposed between the contact plate 304 and block 278. They are spaced apart sufficiently (in the direction of the drum axis, as shown in FIG. 15) to define a pocket 312 into which the stylus can be inserted simply by dropping it in place. The cross-bar portion 266 of the stylus is seated across the top of the holder thereby determining the position of the end of the wire portion 268 on the drum.

A conventional high-voltage control circuit (not shown) will be completed through an electrically conductive layer in stencil sheet 188 and stylus wire 268, via conduct plate 304 and conductor 314. When the stylus is deflected forwardly by the solenoid, as shown in solid lines in FIG. 14, the bared crook portion 270 of the wire electrode will be pressed into positive, electrically conductive relationship with the tongue 308. Normally, in the retracted or "off" position of the stylus, shown in broken lines in FIG. 14, the wire electrode is not in contact with the tongue 308. In effect, it acts as a switch, connecting and disconnecting the high voltage source which provides the sparking potential between the end of the wire electrode and the stencil sheet.

To prevent the accumulation of oxides and other detritus at the end of the wire electode 268, it is dressed once each revolution by the abrasive strip 102. This detritus will be drawn away through tube 49 by suction fan 47 as already described. Because stencil sheet holder 50 is slightly elevated beyond the diameter of the stencil sheet itself, as shown in FIG. 12, there is a tendency for the stylus to vibrate as the wire electrode first engages the stencil sheet beyond the stencil sheet holder. Without correction, this would cause the wire electrode to "bounce", for an inch or more after it first engages the stencil sheet, thereby severely impairing the quality of the image cut thereon. As stated above, attempts have been made to solve this problem by providing vibration-dampening elements such as loose rivets on each individual stylus. This, plus the conventional way of making styluses as a combination or lamination of metal and plastic elements has been relatively expensive, considering the fact that these are basically expendable and must be replaced whenever the wire electrode is worn down. In the present invention, it has been possible to completely eliminate all tendency for the stylus to vibrate at the leading edge of the stencil sheet simply by means of the soft felt-like nose 300 on the solenoid plunger. This effectively absorbs vibration and enables use of an extremely low-cost throw-away stylus, as shown in FIG. 16.

Scan Rate Control and Manual Override

The scan rate control and manual override mechanism shown in FIGS. 17, 18, 21, 22, 23a, 23b, 24a and 24b will now be described. This is the mechanism which determines the speed of the carriage 52 along the drum 38. This controls the speed of the scanning head 54 along the original subject sheet 82 and of the cutting or copying head 56 along the stencil sheet 180. This determines the time for cutting the stencil, and the extent to which fine details on the original are reproduced. A slow speed provides more lines of reproduction per inch along the stencil sheet and reproduces fine details better. A typed menu is one examle for which a stencil may be cut at high speed with excellent results because there is no need to reproduce fine details. On the other hand, where the original includes artwork such as a photograph or drawing, the quality of the reproduction will generally be improved by cutting the stencil at a slower axial speed along the drum.

Referring to FIGS. 21-24(b), a cable 316 is trained for orbital movement about a drive pulley 318 and an idler pulley 320. As shown in FIG. 22, the drive pulley has a central, knurled axial boss 322, press-fitted into a central bore 324 within a cable drive gear 326. The drive gear and pulley thus, in effect, function as though they were integral and, in fact, they may be so made, if desired. A cable drive motor bracket 328 is fastened to the frame by bolts or rivets 330. The drive pulley boss 322 has a central axial bore 332 which is rotatably journaled on a fixed stud 334 fastened to the upstanding wall section 336 of the motor bracket 328. At the left end of the stencil cutter frame 30, an idler bracket 338 is fixed to the frame by bolts or rivets 340. The idler pulley 320 is rotatably journaled on a stud 342. Both pulleys 318 and 320 have a peripheral V-groove for the cable. As shown in FIGS. 21 and 22, a low speed motor-clutch unit 344 and a high speed motor clutch 346 are fastened to the drive motor bracket 328. Each unit includes a motor M and a step-down gear box G. Low speed motor-clutch unit 344 has a low speed pinion 348. High speed motor-clutch unit 346 has a high speed pinion 350. Both are engaged with drive gear 326. These motor-clutch units may be standard, off-the-shelf items, each including a constant speed motor, stepdown gearing, and an overrunning clutch, none of which are shown in detail. Briefly, however, the stepdown gearing differs in the two units so that the high speed pinion 350 rotates faster than the slow speed pinion 348. In one specific arrangement, pinions 348 and 350 are driven at one and three revolutions per minute, respectively.

The overrunning clutches are designated 352 and 354 for the low speed and high speed units, respectively. They are shown diagrammatically in FIGS. 23a, 23b, 24a, and 24b. To simplify the description, the clutches are illustrated as if they were parts of the drive pinions. In actual practice, they will generally be components of the gear boxes. As illustrated, they comprise conventional sprags 356 interposed between outer races 358 (carried by the toothed peripheries) and the inner races 360 (shown as external cylindrical surfaces on shafts S extending from the gear boxes). Thus, referring to the diagrammatic FIGS. 23a, 23b, 24a, and 24b, counterclockwise rotation of drive shafts 361 drives the pinions 348 and 350 counterclockwise. Either pinion, when so driven, rotates drive gear 326 clockwise.

Thus, actuation of either motor-clutch unit 344 or 346 drives gear 326 in a clockwise direction while the clutch of the other unit overruns or free-wheels, allowing the motor and gearing of that other unit to remain stationary. The only difference, in the example described, between motor-clutch units 344 and 346 is that the high speed unit 346 drives the gear 326 and moves the cable 316 three times as fast as the low speed unit 344.

A tension spring 366 connects the adjacent opposite ends of the cable. The cable is connected to the carriage 52 through a bracket 362 which has an inverted L-shape, with an upper horizontal leg 365 connected to the underside of the carriage by one or more screws 364. It has a vertical leg 367 to which one end portion of the cable just to the right of the spring 366 (FIG. 21) is connected by means of a clamp 368 and screws 370.

A handle assembly, generally designated 372, is mounted on the top of the carriage 52 enabling the carriage and the scanning and cutting heads 54 and 56 carried by it to be moved manually; for example, to set the scanning head at the left edge of the image on the original subject sheet as the first step in adjusting the machine to cut a stencil. The handle assembly 372 automatically overrides the cable drive motor-clutch units 344 and 346, as will now be described.

As best shown in FIGS. 5, 8, 17, 18 and 21, a pair of upstanding L-shaped cable clamp lever brackets 374, 374 are spaced fore and aft of the carriage 52 and fastened to the top of carriage by screws 376. Alternatively, a single bracket 374 may be employed. A cam 378 is pivoted on a pivot pin 380 fastened between the brackets. A cam shaft handle 382, with an actuating knob 384, extending upwardly from the cam. As best shown in FIG. 18, the bottom of the cam is flat, having lefthand and righthand lobes 386, and 388. A bellcrank lever, generally designated 390, is pivoted about a pin 392 which extends between the brackets 374. The bellcrank lever has an upper, horizontal leg 394 and a lefthand vertical leg 398. The upper leg has a top surface 396 parallel to the bottom of the cam 378 and engageable by the cam lobes 386 or 388 when the handle 382 is moved to the left or right. The vertical leg 398 is fastened by a clamp 400 and screw 402 to the end of the cable 316 just to the left of the spring 366.

The spring urges the bellcrank in a counterclockwise direction about the pin 392 to the solid line position shown in FIG. 18 where the upper surface 396 of the horizontal leg 394 is in parallel, closely-spaced, relation to the cam lobes 386 and 388. The handle 382 is normally in the center position, shown in solid lines in FIG. 18. That centered position is also shown, diagrammatically, in FIG. 25. In this position, the spring 366 tensions the cable and contracts it into frictional engagement with the drive pulley 318. Inasmuch as this pulley is not freely rotatable to back-drive the relatively small pinions 348 and 350, this frictional engagement between the cable and the pulley holds the carriage stably in a fixed position until one of the motors 344, 366 is actuated, or the handle 382 is moved.

Referring to FIGS. 18, 21, 25, 25a and 25b, movement of the handle 382, in either direction, to the right or left, shifts the vertical leg 398 of the bellcrank lever to the left. The cable loop enlarges, releasing its frictional engagement with the drive pulley. This enables the carriage 52 to be moved to the right or left, in whatever direction the handle 382 is pressed, thereby manually overriding the motor drive for the cable. This will now be described in detail.

Movement of the bellcrank lever 390 is limited by a cam stop bushing 404 (FIGS. 17 and 18) which is held in place by a cap screw 406 extending between brackets 374, 374. Movement of the handle 382 in either direction releases the frictional grip of the cable on the drive pulley as described above, so that the manual effort which moves the handle can also shift the carriage in the same direction. That is, manual force on the handle 382, pressing it to the right, releases the friction grip of the cable on the drive pulley and enables continued pressure on the handle to move the carriage in the same direction while the cable slips loosely around the drive pulley. Conversely, manual force on the handle pressing it to the left releases the frictional grip of the cable on the drive pulley in exactly the same way, and further leftwise pressure on the handle moves the carriage to the left. In either case, release of the handle causes the spring 366 to restore the bellcrank 390 and handle 382 to the centered solid-line positions shown in FIG. 18. This restores the friction grip of the cable on the drive pulley 318, readying the carriage for stencil-cutting traverse by one or the other of the motor-clutch units 344 and 346.

Low and high speed scan operation, as shown in FIGS. 24a and 24b, respectively, will now be described for one specific stencil cutter made in accordance with the present invention in which the low speed pinion 348 and high speed pinion 350 are driven by their motor-clutch units at one and three r.p.m., respectively.

Each pinion 348 and 350 has 14 teeth. This provides a speed reduction of 4.57 from either pinion to the drive gear. Drive pulley 326 has an effective diameter of 1.453 inches and a circumference of 4.566 inches. The drum 38 is rotated at 400 r.p.m. With these specific parameters, the low speed motor-clutch unit 344 moves the carriage 52 at exactly one inch per minute, scanning the image on the original subject sheet at the high resolution rate of 400 lines per inch and transferring the image to the stencil sheet at the same rate. And the high speed motor-clutch unit 346 moves the carriage at three inches per minute, scanning the original sheet at 133 lines per inch and transferring the image to the stencil sheet at the same rate.

With the low speed motor-clutch unit 344 energized to drive the cable through low speed pinion 348, as shown in FIG. 24a, the high speed overrunning clutch 354 free wheels, allowing the high speed motor-clutch unit 346 and its associated gearing to remain stationary.

With the high speed motor-clutch unit 346 energized to drive the cable through high speed pinion 350, as shown in FIG. 24b, the low speed overrunning clutch 352 free wheels, allowing the low speed motor-clutch unit 344 and its associated gearing to remain stationary.

To move the carriage 52 leftwise manually, the handle 382 is moved to the lefthand position shown in broken lines in FIG. 18, this being shown in solid lines schematically, in FIG. 25a. This moves the bellcrank lever 390 clockwise to its limit position against the stop bushing 404. This position of the bellcrank lever is shown in broken lines in FIG. 18 and in solid lines in FIG. 25a. This stretches spring 366, enlarges the cable loop, and releases the friction grip between the cable and the drive pulley, enabling the cable to slide freely around the pulley even though the latter is held non-rotatable by gear 326 and pinions 348, 350. FIG. 23a has been drawn to show a small space between the cable 316 and the drive pulley 318 to emphasize the freedom with which the cable may slide about the pulley even though the pulley and the drive gear are held against rotation. Typically, this is the initial manual overriding adjustment for aligning the scanning head with the lefthand edge of the image on the original subject sheet prior to cutting a stencil.

To move the carriage 52 rightwise manually, the handle 382 is moved to the righthand position shown in broken lines in FIG. 18, this being shown schematically in solid lines in FIG. 25b. This also moves the bellcrank lever 390 clockwise to its limit position against the stop bushing 404, again stretching spring 366 and releasing the friction grip between the cable and the drive pulley as is indicated by the space shown between the cable 316 and drive pulley 318 in FIG. 23b.

Thus, whether the handle 382 is moved to the right or to the left, it moves the vertical leg 398 of the bellcrank identically, namely to the left against the stop bushing 404. This stretches the spring 366, enlarges the cable loop, and releases the frictional grip on the drive pulley so that the carriage 52 is free to slide in the direction that the handle is moved, without any resistance from the drive pulley.

Alternatively, another mode of accomplishing rightwise manual movement of the carriage can be effected simply by pushing the carriage to the right without touching the handle to release the cable from the drive pulley. The reason for this is that the sprags 356 of the overrunning clutches are oriented to free-wheel when the upper strand 316a of the cable moves to the right. In other words, without releasing the frictional grip between the cable and the drive pulley, movement of the upper strand of the cable with the carriage, against only minimal frictional resistance, is possible because the drive gear 326 can be rotated clockwise due to the fact that both overruning clutches free wheel in that direction. In this alternative mode, righthand movement of the carriage and the upper strand of the cable would be accompanied by simultaneous rotation of the drive gear 326 and pinions 348 and 350, but without back rotation of the gearing or the motors.

As best shown, in FIG. 18, and in the schematical diagrams of FIGS. 25, 25a and 25b, the pivot pin 380 is offset eccentrically on the cam 378, to the left of center, toward the bellcrank pivot pin 392. This enables the same magnitude of movement of the handle 382, whether to the right or left, to move the bellcrank lever 390 against stop bushing 404. Details of one specific arrangement will now be described giving exemplary dimensions.

Refer to the dimensions shown on FIGS. 25, 25a and 25b. Here the handle 382 is 2.5" long. The bottom face on cam 378 is indicated merely by a line which is 0.75" wide. Pivot pin 380 is offset ⅛" to the left of center of the cam. This makes cam lobes 386 and 388 exactly 0.25' and 0.50' wide to the left and right respectively of the center of pin 380. The widths of these cam lobes are designated "a" and "b" respectively in FIG. 25. When the handle 382 is pivoted to the left or right, corners 408 or 410, at the ends of the cam lobes, engage the top surface of bellcrank lever horizontal leg 394. The distance from pivot pin 392 to the nearest cam lobe corner 408 is exactly 0.75" and is designated "A". The distance from pivot pin 392 to the farthest cam lobe corner 410 is 1.50" and is designated "B". The vertical leg 398 of the bellcrank lever is 2.5" long. As shown in FIGS. 25a and 25b, it takes exactly 0.25" movement of the top of the handle 382, either to the left or the right, to move the bottom end of the bellcrank lever exactly 0.083" to the left.

The invention, of course, is not limited to the above specific dimensions. There is, however, a special relationship between cam lobes 386 and 388, and the distances from the bellcrank pivot pin 392 to the nearest and farthest corners of the cam member which gives optimum results. This may be expressed by the general formula:

$$a/b = A/B$$

Copy Size Control Mechanism

An important and unique part of the present invention is the mechanism for controlling the size of the image cut on the stencil. At the operator's option, either the width, or the length, or the overall size of the image reproduced on the stencil may be the same size, or larger, or smaller than the corresponding dimension or dimensions of the image on the original subject sheet. This mechanism is best shown in FIGS. 5, 7, 8, 8a, 8b and 19. Various operating positions for enlarging the image are shown in FIGS. 19a, 19b and 19c; and operating positions for reducing the image are shown in FIGS. 20a and 20b.

As described, the copy width control base 240 is attached to the flange 234 of the support 230 by means of screws 242. This, of course, means that the control base 240 is, in effect, part of the carriage 52 and moves with it. As best shown in FIG. 7, a bushing 412 is fastened to the underside of the control base 240; an upper, necked-down section of the bushing 412 is swaged into an opening 414 in the control base. The bushing has a vertical bore 416. A main pivot pin 418 comprises a central shaft 420, a flange 424 intermediate its ends, and an upper head 428. The lower portion of the shaft 420 is journaled within the bore 416, being retained by a C-washer 422. The flange 424 has a depending cylindrical skirt 426 rotatably slideable upon the upper surface of control base 240.

Main pivot pin 418 is permanently staked to a channel member 430. The latter comprises a lower horizontal web 432 and a pair of upstanding flanges 434. An upper, stub end portion of the shaft 420 extends through an opening 436 in web 432 and is permanently attached to it by a staking operation which produces the head 428. This holds the pivot pin 418 and channel member 430 tightly interconnected and effective as though they were integral.

A pivot slide rod 438 is slideably journaled in a bore 440 in a bushing block 442, which is fastened by welding or brazing within the rear end of the channel 430. The rear end of the slide rod is attached as by welding to a hub 444 journaled on a vertical pivot shaft 446, supported on a bracket 448 which is fastened as by screws 450 to a spacer block 452 (FIG. 6) suitably fastened to the back wall 34. The channel member 430 has vertical end walls 454 and 456.

An adjustment pin member 458 is mounted for slideable movement within a slot 460 formed in the top slide 58. The adjustment pin member determines the size of the image cut on the stencil sheet. As will be explained, the position of the adjustment pin member within the slot determines whether the size of the image on the stencil sheet 180 is the same size, or smaller, or larger, than the image on the original subject sheet 82.

The adjustment pin member 458 has a body with a cylindrical surface 462 and a pair of parallel, flat, side surfaces 464, 464 which fit slideably within the slot 460.

It has an integral, depending shaft 466 on which a rectangular shoe 468 is pivotally mounted. The shoe is retained by a C-washer 470. An annular bezel 472 has a non-circular opening 474 with a pair of flat surfaces matching the flats 464 on the adjustment screw 458. The bezel has a beveled surface 476 with a radial indicator line 478 (FIG. 8b). An externally knurled lock-nut 480 is threadedly engaged with the upper, screw-threaded portion 482 of the adjustment pin member 458.

As shown in FIG. 8b, the top slide 58 is provided with a scale parallel to the slot 460. In FIG. 8b the indicator line 478 is aligned with "0" on the scale. The bezel is moveable to position that indicator line anywhere along the scale between "−20%" and "+10%". The purpose of moving the bezel, of course, is to move the shoe 468 to different operative positions within the channel member 430. It is locked in place by tightening the lock-nut 480 which draws the surfaces 484 of the adjustment pin upward into tight, frictional engagement with the underside of the top slide 58.

Thus, it will be appreciated that the adjustment pin member 458 and shoe 468 comprise a first moveable pivotable connection between the top slide 58 and a control lever 429 which includes the channel member 430 and slide rod 438—this first pivotal connection being adjustable to various positions along the slot 460 in the top slide 58. The main pivot pin 418 comprises a second pivotal connection, this acting between the control lever and the copy width control base 240—this second pivotal connection being fixed at the center of the base 240.

When the bezel indicator line 478 is at "0", the adjustment pin member 458 is directly over the main pivot pin 418, and the two pivotal connections described above are aligned. At this adjustment, the scanning head 54 and stencil cutting head 56 move at exactly the same speed, and the same distance, causing the image cut on the stencil sheet to be exactly the same width as the image on the original subject sheet.

When the bezel indicator 478 is moved into the minus portion of the scale (upward in FIG. 8b), the adjustment pin member 458 will be moved out of alignment with the main pivot pin 418. This causes the stencil cutting head 56 to move slower, and a lesser distance, than the scanning head 54 and results in the image on the stencil sheet being narrower than on the original sheet.

Conversely, when the bezel indicator 478 is moved into the plus portion of the scale (downward in FIG. 8b), the adjustment pin member 458 will move in the opposite direction. This causes the stencil cutting head 56 to move faster, and a greater distance, than the scanning head 54 and results in the image on the stencil sheet being wider than on the original sheet.

Before describing specific examples of image reproportioning by means of the present invention, a general mathematical relationship between certain of the components, as shown in FIG. 19, can be expressed as follows:

$$W_c = W_o \frac{(L + L')}{L}$$

where
- $W_c$ = width of image produced on stencil sheet;
- $W_o$ = width of image on original subject sheet;
- $L$ = shortest distance between the center of fixed pivot shaft 446 and the line of movement of the main pivot pin 418, as measured perpendicular to that line of movement; and L'=shortest distance between the lines of movement of the main pivot pin 418 and the adjustment pin member 458, is measured perpendicular to these lines of movement.

In the specific example illustrated, L=4 inches; and the distance between decimal markings on the scale in FIG. 8*b* is 0.4".

FIGS. 19*a*, 19*b*, and 19*c* illustrate the locknut 480 in its −20% position. FIG. 19*a* shows the parts in their centered position with the cutting head 56 and top slide 58 being centered on the base plate 240, which is fastened to the carriage 52 for movement from side to side with the scanning head 54.

FIG. 19*b* shows the carriage 52 moved to the left to a position where the scanning head (not shown in this figure) is aligned with the lefthand edge of the image on the original subject sheet. Assuming this is an 8½" wide subject sheet, the entire width of which is being scanned, the carriage position in FIG. 19*b* is 4¼" to the left of the centered position shown in FIG. 19*a*.

FIG. 19*c* is the opposite counterpart of FIG. 19*b*, showing the carriage 52 moved 4¼" to the right of center where the scanner will stop at the righthand edge of the original subject sheet.

By substituting $W_o = 8.5"$; $L = 4"$; and $L' = -0.8"$ in the general formula above, it can be seen that, where the locknut 480 is set at −20%, 8.5" movement of the scanning head will occur simultaneously with 6.8" movement of the cutting head 56. As illustrated in FIGS. 19*b* and 19*c*, a point "A" at the corner of the base 240 (which is connected to and moves with the carriage 52 and the scanning head 54) moves exactly 8.5" to the right, while the stylus electrode wire 268, at a point B, moves exactly 6.8". This is precisely a 20% width reduction.

FIGS. 20*a* and 20*b* are comparable to FIGS. 19*b* and 19*c* respectively except that the adjusting locknut 480 is moved to the +10% position. Assuming the carriage 52 moves 8.5" from the lefthand margin to the righthand margin, the stylus electrode will move 9.35" to enlarge the image cut on the stencil sheet by 10%.

The above two examples refer, of course, to reproportioning the image copy on the stencil sheet by changing its width without changing its length.

A total resizing of an image may be accomplished in the apparatus by making a second reproduction from a stencil sheet which has been turned at right angles in the original subject sheet holder 48. As a very elementary example, assume a 5-inch square image is to be reduced to 4-inch square. Using the −20% adjustment illustrated in FIG. 19*a*, the image on the stencil sheet will be 5" high and 4" wide. By making a copy from that stencil and turning it at right angles on the subject sheet holder, the second stencil produced would be precisely 4" square.

Broadly considered, the width-varying apparatus, just described, comprises mechanism for moving the scanning and the cutting heads 54 and 56 different distances along the original and stencil sheet sections of the drum 38. If the cutting head moves farther than the scanning head, the stencil image is wider than the original image. If the cutting head moves lesser than the scanning head, the stencil image is narrower than the original image.

In the present invention, the scanning head is directly movable by the carriage 52 inasmuch as it is attached to it, and the cutting head is indirectly movable by it through the control lever means 429. Alternatively, the construction may be reversed; that is, the cutting head may be directly movable with the carriage while the scanning head is indirectly movable through some counterpart of the lever means 429.

Viewing the copy size control mechanism broadly, there are two separate carriages which support the scanning and reproducing heads for movement lengthwise of the drum, and for movement relative to each other to reproportion the image. In the terminology of some of the claims, component 52, which supports scanning head 54, is one carriage. The top slide 58, which supports reproducing head 56, is another carriage. Control lever means 429 has one end portion swingable about a fixed pivot 446. Its other end portion has a first pivotal connection through main pivot pin 418 to the first carriage 52, and a second pivotal connection 466 to the second carriage 58. The lever means is also slidable relative to this second pivotal connection. The second pivotal connection 466 is adjustable within slot 460 through a range of individual positions held by adjustable locknut 480.

As best shown in FIG. 19*a*, the first pivotal connection 418 moves along an axis 0—0. This is parallel to the drum axis D—D shown in FIG. 5. The second pivotal connection 466 (beneath, and aligned with, the locknut 480) is movable along an axis X—X, which is also parallel to the drum axis. When axes 0—0 and X—X coincide, as for the zero adjustment position shown in FIG. 8*b*, the image copied onto the stencil sheet is the same width as that on the original subject sheet. When the axis X—X is between the fixed pivot 446 and axis 0—0, as shown in FIG. 19*a*, the image copied onto the stencil sheet is narrower than the original. When the axis X—X is forward of the axis 0—0, as shown in FIG. 20*a*, the image copied onto the stencil sheet is wider than the original.

While the original and stencil sheets are on the opposite end portions of the one-piece drum 38, separate drums may be employed for the separate sheets, and they do not necessarily have to be axially aligned, or even rotatable in the same direction.

Use and operation of the electronic stencil cutter will be apparent, to one skilled in the art, from the preceding description. Briefly, however, a few examples will be described as follows.

Assume, for a simplified example, that the image on the original subject sheet 82 is a 5-inch square designated by the reference numeral 486, as shown in FIG. 26.

As a first step, the sheet 82 will be placed in the original subject sheet holder 48. Referring to FIGS. 2, 3 and 4, the removable strip 86 with its fastener member 90 is lifted outwardly, releasing it from the fixed mutually adherent "Velcro" fastener member 88. The operator then simply lifts up the clear plastic retainer sheet 84, inserts the original subject sheet 82 between it and the base sheet 70 as shown in FIG. 3, with image 486 facing outwardly, closes the retainer sheet and fastens it in place by pressing fastener member 90 against the mutually adherent "Velcro" fastener member 88.

Next, a blank stencil sheet 172 is placed in the stencil sheet holder 50. Referring to FIGS. 9–13, the clamp bar 94 is opened by moving each of the latch members 140, 140 outwardly to the open position shown in FIG. 11. The ends 174, 176 of the stencil sheet are then inserted into the drum slot 92 beneath the flanges 98, 98, and then tensioned snugly about the drum surface 72. The clamp bar is then pressed inwardly to the locked position shown in FIGS. 10 and 12, where the stencil sheet is held tightly assembled about the drum.

Next, the carriage 52 is moved leftwise to a beginning position. This is effected simply by pressing knob 384 at the top of handle 382 to the left. This extends the spring 366, enlarges the loop of cable 316, and releases its frictional engagement with the drive pulley 318. With the cable so freed, further leftwise pressure on knob 384 readily moves the carriage 52 with the scanning and cutting heads to a lefthand position where the scanning head is centered slightly to the left of the left edge of the image 486.

For the purpose of this example, assume the image 486 is to be cut on the stencil sheet with the width reduced 20%, and with the height reproduced the same size. The adjustment for this is made through the door 488 in the top of the housing by setting the width control knob 480 at the "−20%" position, as shown in FIGS. 19a, 19b, and 19c.

Before operating the machine, certain other adjustments may be made. The mechanisms for making these adjustments form no part of the present invention so will not be described in detail. Briefly, however, there is a scanning limit control knob 490 which is adjustable to determine the limit of righthand movement of the carriage and to automatically shut off the machine after the scanner has passed the righthand edge of the image being copied. Any suitable apparatus may be employed for this purpose. Here, a simplified reed switch control is shown. This includes a small permanent magnet 496 on the pointer 494 (FIGS. 5, 6 and 8) and a magnetic-field-responsive reed switch 498 supported on a bracket 500, mounted by screws 502 to the top horizontal web 186 of the carriage. The reed switch has a pair of conductors 504, 506 suitably connected (by means not shown) to the electrical power supply for scanning motors M. The reed switch 498 is magnet-responsive so that when it is moved into proximity with the magnet 496 the reed switch will actuate. This will de-energize the scan motor. Thus, one of the preoperational adjustments is to move the pointer 494 by means of scanning limit control knob 490 to the desired right-hand limit of movement of the carriage.

Other preoperational adjustments include setting of the white background level by knob 508 and setting of the blackness level with knob 510; these utilize an electronic light level balancing circuit which forms no part of the present invention and therefore is not described. In addition, depending on the scan feed rate desired, either slow scan button 512 will be pressed to activate the normal or slow speed motor-clutch unit 344, or fast scan button 514 will be pressed to activate high speed motor-clutch unit 346.

With the foregoing preoperational adjustments made, it is necessary only to press the "start-scan" button 516 to begin the automatic stencil-cutting procedure. This causes activation of various components and sub-assemblies as follows. Motor 40 rotates the drum 38 through the belt 46 and operates suction fan 47 which is connected by a flexible tube 49 to a fan intake area 51 just below the cutting head 56 (FIGS. 5 and 14). This draws away the carbonaceous dust and detritus generated by the sparking electrode wire 268 and by the abrasive strip 102 and transfers it to filter 518 which will be cleaned or replaced from time to time. One or the other of the motor-clutch units 344 or 346, depending on low or high speed selection mentioned above, is energized and starts moving the carriage 52 to the right while the drum is rotated. This causes the scanning head 54 to scan the original subject sheet in a helical path having 133 or 400 lines per inch measured along the axis of the drum, depending on whether the normal low speed or high speed motor-clutch unit 344 or 346 is energized. Variations in light intensity, reflected from the image 486 on the original subject sheet 82, are converted (by means not shown) in the control box 28 and applied as high voltage pulses between the electrode 268 and the stencil sheet 180 in the conventional manner. This causes a spark to burn an opening in the stencil sheet when the scanning head 54 senses a dark area on the original subject sheet.

With the width-control adjusting locknut 480 in the "−20%" position of the present example, the top slide 58, which carries the cutting head 56, moves a 20% lesser distance along the drum 38 than the scanning head 54. In the present example, where the original image 486 is 5" wide, this means that the image 486' cut on the stencil sheet 180' will be only 4" wide while its height is unchanged at 5".

The stencil sheet 180' shown in FIG. 27, with the reproportioned image 486', can then be used in a conventional duplicating machine to make multiple paper copies of the 4" wide and 5" high image. To provide a complete, uniform, 20% reduction of both width and height, one of these paper copies can be turned at right angles in the original subject sheet holder 48 with the 5-inch dimension parallel to the axis of the drum. By cutting another stencil 180" with the width-control button 480 still set at "−20%", the 5-inch width will be reduced to 4" while the 4-inch height remains unchanged, thereby producing a 4-inch square image 486" uniformly resized to the smaller scale. This second stencil can then be used to produce multiple paper copies of the 4-inch square image in a duplicating machine.

With the width-control adjusting locknut 480 in the "+10%" position, as shown in FIGS. 20a and 20b, the 5-inch square image 486 on original sheet 82 can be reproportioned wider on a stencil sheet 180''', as shown in FIG. 29. There, the image 486''' is widened to 5.5" and its height is unchanged at 5". If a uniform 10% enlargement of the original image 486 is desired, a paper copy of image 486''' will be made, turned at right angles in the original sheet holder 48, and a new stencil cut as described above.

While a preferred embodiment of the invention has been illustrated and described, it should be understood that variations will be apparent to one skilled in the art without departing from the principles described. Accordingly, the invention is not to be limited to this specific embodiment illustrated in the drawings.

The embodiments of the invention in which an exclusive property or privilege is claimed are defined as follows:

1. In a stylus assembly for an electronic stencil cutter for perforating an electrostencil sheet mounted on a rotatable drum, said stylus assembly comprising:
   a frame adapted to be mounted adjacent the drum;
   a solenoid, a stylus, and stylus guide means supported by said frame;
   said solenoid having a plunger with a nose end extendible toward the drum when the solenoid is energized and retractible therefrom by spring means when the solenoid is deenergized;

said stylus comprising an elongated, flat, blade-like body member of flexible, elastic, electrical insulating material having a wire electrode extending from one end thereof;

said stylus guide means having a slot for receiving and supporting said stylus in position for engagement by the nose end of said plunger to thereby press the tip of said wire electrode against an electrostencil; the improvement comprising a layer of soft, felt-like material interposed between said nose end and said body to dampen oscillations of the body.

2. In a stylus assembly for an electronic stencil cutter, the improvement of claim 1 in which said stylus guide means includes a fixed stop member positioned in front of the nose end of the plunger and effective to limit deflection of the stylus by movement of said nose end when the solenoid is energized.

3. A stylus assembly for an electronic stencil cutter for perforating an electrostencil sheet mounted on a rotatable drum, said stylus assembly comprising:

a frame adapted to be mounted adjacent the drum;

a solenoid, a stylus, and stylus guide means supported by said frame;

said solenoid having a plunger with a nose end extendible toward the drum when the solenoid is energized;

said stylus comprising an elongated, flat, blade-like body member of flexible, elastic, electrical insulating material having a wire electrode extending from one end thereof;

said stylus guide means including a fixed stop member positioned in front of the nose end of the plunger and effective to limit deflection of the stylus by movement of said nose end when the solenoid is energized and having a slot for receiving and supporting said stylus in position for engagement by the nose end of said plunger to thereby press the tip of said wire electrode against an electrostencil;

said wire electrode being located on the side of said body opposite said nose end of the plunger; and an electrical circuit is completed directly through said stop member and said wire electrode in response to deflection of said body by said solenoid when energized.

4. In a stylus assembly for an electronic stencil cutter, the combination of claim 3 in which a layer of soft, felt-like material in interposed between said nose end and said body to dampen oscillations of the body.

* * * * *

UNITED STATES PATENT AND TRADEMARK OFFICE
CERTIFICATE OF CORRECTION

PATENT NO. : 4,319,253  
DATED : March 9, 1982  
INVENTOR(S) : Arthur J. Heyer et al Page 1 of 2

It is certified that error appears in the above—identified patent and that said Letters Patent is hereby corrected as shown below:

```
Column 2, line 24, "mechanism" should be -- mechanisms --;

Column 5, line 40, "at" should be -- of --;

Column 5, line 56, delete the second "each";

Column 6, line 28, "3,099,235" should be -- 3,009,235 --;

Column 7, line 63, "apertuers" should be -- apertures --;

Column 8, line 2, "is" should be -- in --;

Column 9, line 60, "flame" should be -- frame --;

Column 10, line 29, "conduct" should be -- contact --;

Column 11, line 14, "examle" should be -- example --;

Column 14, line 53, "25'" should be -- 25" --;

Column 14, line 54, "50'" should be -- 50" --; and
```

UNITED STATES PATENT AND TRADEMARK OFFICE
CERTIFICATE OF CORRECTION

PATENT NO. : 4,319,253

DATED : March 9, 1982

INVENTOR(S) : Arthur J. Heyer et al.

It is certified that error appears in the above—identified patent and that said Letters Patent is hereby corrected as shown below:

Column 22, line 24, "in" should be -- is --.

Signed and Sealed this

Twenty-second Day of June 1982

[SEAL]

Attest:

GERALD J. MOSSINGHOFF

Attesting Officer — Commissioner of Patents and Trademarks